Dec. 2, 1947.  M. WATTER ET AL  2,432,055
FABRICATED AIRCRAFT STRUCTURE
Filed Oct. 28, 1944  3 Sheets-Sheet 1
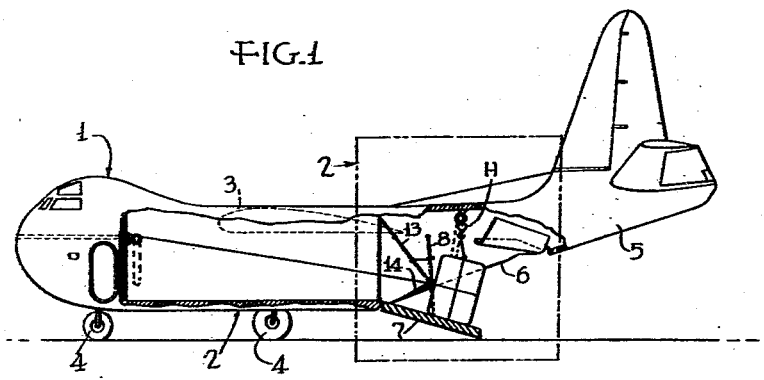
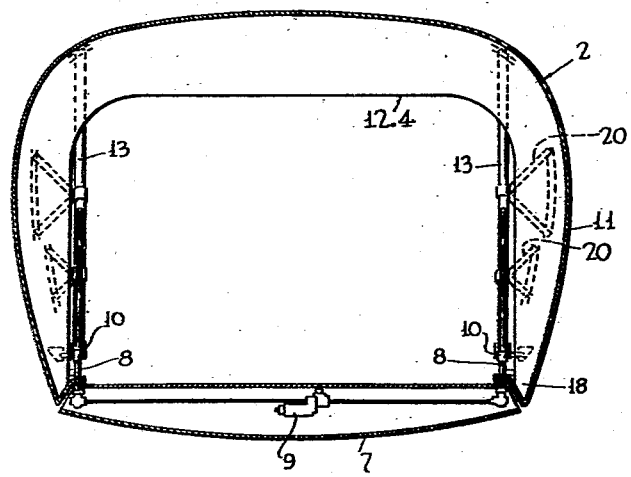
INVENTORS
Michael Watter
Albert G. Dean
BY John P. Tarbox
ATTORNEY Dec. 2, 1947.   M. WATTER ET AL   2,432,055
FABRICATED AIRCRAFT STRUCTURE
Filed Oct. 28, 1944   3 Sheets-Sheet 2

INVENTORS.
Michael Watter
Albert G. Dean
BY John P. Tarbox
ATTORNEY

Dec. 2, 1947.　　M. WATTER ET AL　　2,432,055
FABRICATED AIRCRAFT STRUCTURE
Filed Oct. 28, 1944　　3 Sheets-Sheet 3

INVENTOR
MICHAEL WATTER
ALBERT G. DEAN
BY John P. Tarbox
ATTORNEY

Patented Dec. 2, 1947

2,432,055

UNITED STATES PATENT OFFICE 2,432,055

FABRICATED AIRCRAFT STRUCTURE

Michael Watter, Philadelphia, and Albert G. Dean, Narberth, Pa., assignors to The Budd Company, Philadelphia, Pa., a corporation of Pennsylvania Application October 28, 1944, Serial No. 560,872

8 Claims. (Cl. 244—137)

This invention relates to fabricated aircraft structures, particularly to airplane fuselages, and has for an object the provision of anchorages on the sides of a C- or horseshoe-shaped fuselage or body section which will distribute concentrated loads and avoid distortion of the fuselage.

The above and other objects and advantages of the invention will be apparent from the following description of an exemplary embodiment, reference being made to the accompanying drawings thereof, wherein:

Fig. 1 is a side elevation and section of an airplane embodying the invention;

Fig. 3 is a vertical transverse section taken on the line 3—3 of Fig. 2;

Figures 5, 6:
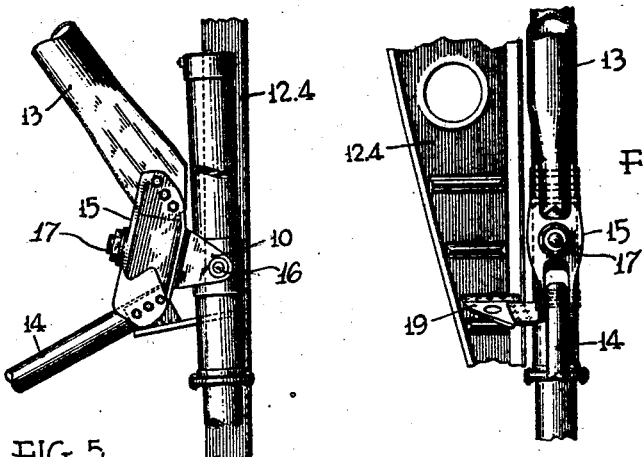
Fig. 5 is an enlarged view of the strut joint connection shown in Figs. 2 and 4.
Fig. 6 is an enlarged transverse vertical section taken on the line 6—6 of Fig. 2.
Figure 2:
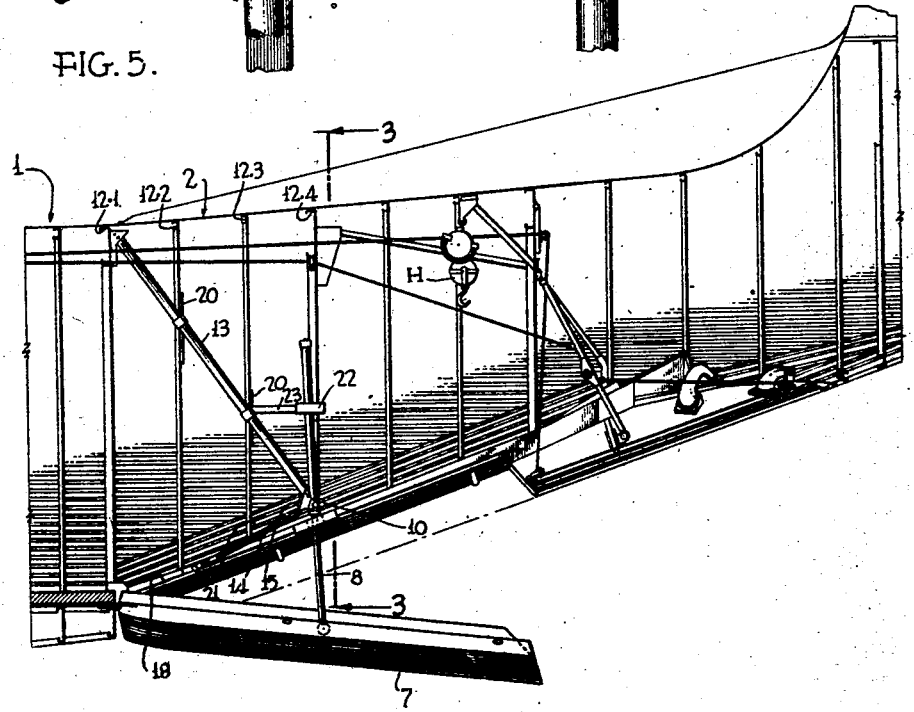
Fig. 2 is an enlarged longitudinal section taken in the zone 2 of Fig. 1.
Figure 4:
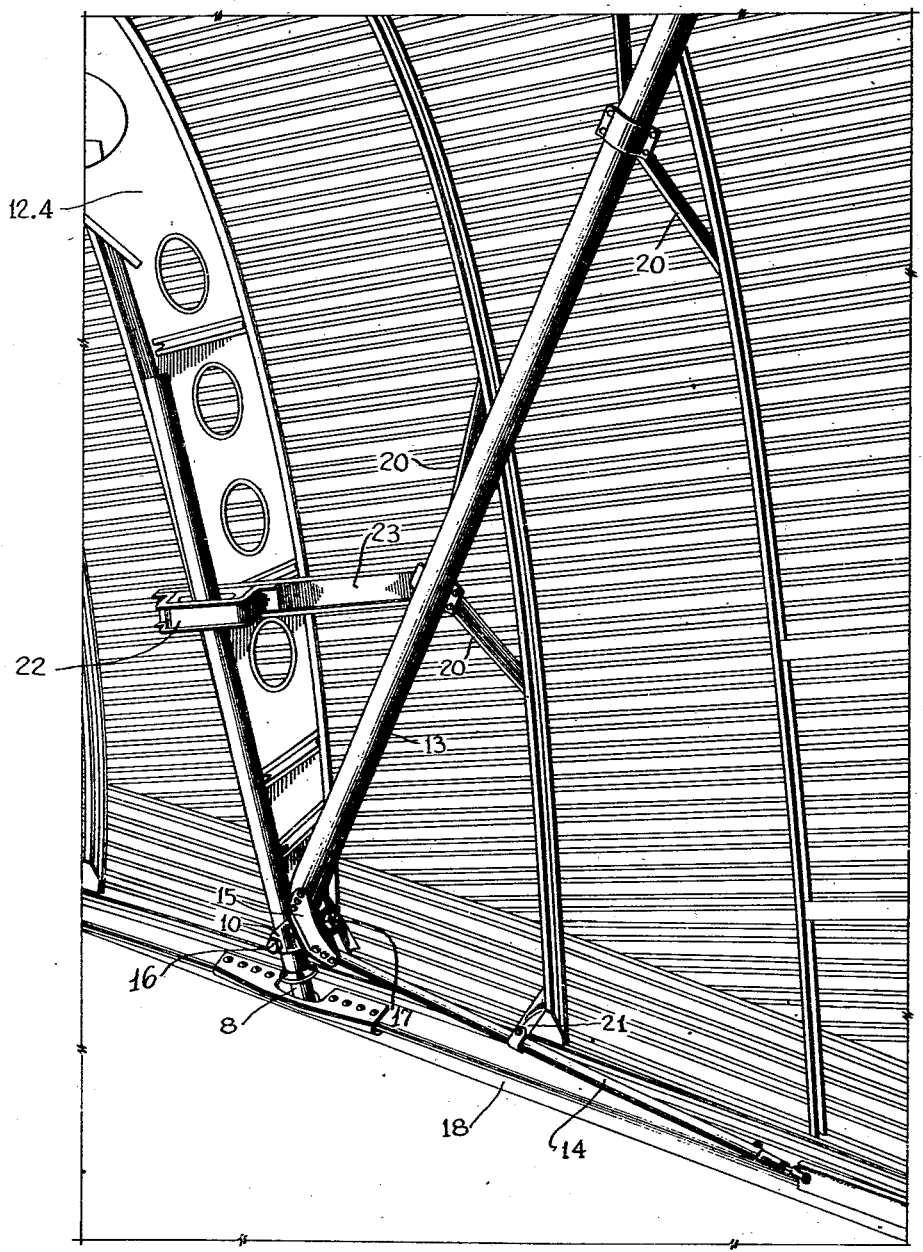
Fig. 4 is an inside perspective view of one side.

The invention is here embodied in an airplane I comprising a fuselage 2, wings 3, landing wheels 4 and a tail 5. The fuselage, toward the rear, has a large inclined bottom opening 6 which is closed in whole or in part by a strong ramp 7. The ramp is hinged at its front end; and aft of the front end, preferably near the mid-length, is provided on each side with an operating strut 8. The struts each may comprise a plurality of rigid telescopic elements, some of which are threaded to others to lengthen or shorten when turned. Power means 9 for operating both of the telescopic struts in unison is provided on the ramp. The lower end of each telescopic strut is hinged to a side of the ramp and an upper portion is hinged to a swivel or trunnion anchorage element or yoke 10 mounted a short distance above the edge of the opening in the fuselage.

The fuselage at the ramp opening, in section, is C- or horseshoe-shaped, as shown in Figure 3, the stressed skin blanket 11 of the fuselage being supported by axially spaced C- or horseshoe-shaped frame elements, ribs, or bulkheads 12, some of which 12.1 at the ramp hinge and 12.4 at the ramp struts are very deep and others of which 12.2 and 12.3 between the hinge and strut may be relatively much lighter. The sides of the fuselage are convex outward in section, as shown in Figure 3.

The load on the ramp may be very great; for example, a motor car being driven up the ramp when desired. Also when the free or rear end of the ramp is pushed down against the ground and an overturning load is applied to the rear end of the fuselage, as on the hoist H near the rear end of the ramp, a heavy compression load is placed on each of the screw struts 8. If the heavy ramp loads transmitted through the struts 8 to the swivel anchorage elements 10 were concentrated at one point on each side, the sides would be likely to be sprung laterally or the local fuselage bulkheads would be likely to be overloaded and distorted. To avoid this, the swivel elements 10 are each mounted on anchorages which distribute the loads to the fuselage in the plane of the swivel element to a plurality of bulkheads and, more particularly, to the strong box section of the fuselage forward of the ramp opening.

Each anchorage comprises an upper inclined strut rod or bar 13 and a lower rod or bar 14, which rods at the swivel are connected together by a joint trunnion or knuckle fitting 15. The swivel element 10 is pivoted to a collar on the outer sleeve of the screw strut element 8 by pins 16 and to the fitting 15 by a stub trunnion shaft 17.

The rods 13 and 14 transfer loads from the open-sided section of the fuselage to the rear end of the closed-sided box section which constitutes the cargo compartment. Specifically the upper rod or strut 13 is connected to the upper part of the side of the heavy bulkhead 12.1; and the lower rod 14 is connected to the strong ramp-opening frame longéron or beam 18, which longéron ties into the bulkhead 12.1 at the ramp hinge line with the bottom of the closed box-shaped cargo compartment.

At their adjacent ends the rods 13 and 14 are connected, through their joint fitting 15 and a bracket 19 to the lower end of the bulkhead 12.4. The bracket 19 is adapted to accommodate vertical movement of the joint while maintaining a relatively fixed relationship between the fitting 15 and the bulkhead anad fuselage side. Lateral movement at the joint is also minimized by confining the struts 8 in slots formed on the longéron 18.

Intermediate its ends the upper rod strut 13 is connected by V-shaped side brackets 20 to the lesser bulkheads 12.2 and 12.3. This braces the strut rod against bending to enable it to take heavy compression loads when necessary, and also braces the side of the fuselage. That is, a kind of truss is formed comprising the fuselage side, strut and bracing brackets.

The lower rod 14 is braced to the light bulkhead 12.3 by a bracket 21 near the longéron 18. The rod 14, though light and adapted to be loaded more heavily in tension, is thus made adequate to take considerable compression loads when necessary.

The upper end of the screw strut 8 is guided in its swinging movements about the yoke pins 16 and restrained against vibration by a felt-lined loop 22 mounted on a strip 23 anchored to the side of the fuselage.

It is thus seen that the invention provides a very strong anchorage for the ramp support upon the side of the fuselage and at the same time largely avoids distortion in the side of the fuselage.

While one embodiment of the invention has been specifically illustrated, it is to be understood that there may be various embodiments within the limits of the prior art and the scope of the subjoined claims.

What is claimed is:

1. In an aircraft in combination, a fuselage having a bottom opening, the fuselage at the opening being C-shaped in transverse section with outwardly convex sides, a ramp hinged at one end of the opening, a ramp operating strut on each side connected to the side of the fuselage and to the side of the ramp, anchorage rods on each side of the fuselage which distribute the load on the ramp strut into the fuselage in the plane of the strut connection with the fuselage, and means bracing said rods intermediate their ends to the side of fuselage.

2. In an aircraft in combination, a fuselage having a bottom opening, the fuselage at the opening being C-shaped in transverse section with outwardly convex sides, the fuselage being formed of spaced bulkheads with a stressed skin covering on the outside, a ramp hinged at one end of the opening, a ramp operating strut at each side connected to the side of the fuselage and to the ramp intermediate its length, and anchorage rods on each side of the fuselage which distribute the load on the ramp strut into the fuselage in the plane of the strut connection with the fuselage, the rods being connected to a plurality of bulkheads.

3. In an aircraft in combination, a fuselage having a compartment of closed cross section and a portion extending from one end thereof which is C-shaped in cross section with a bottom opening, a ramp hinged at the end of the opening adjacent the compartment, ramp operating struts connected between the sides of the ramp and the sides of the fuselage, and anchorage rods on each side of the fuselage which distribute the load on the ramp strut into the side of the fuselage and back to the closed section along the vertical length of a side thereof.

4. In an aircraft in combination, a fuselage having a cargo compartment of closed cross section and a portion extending from one end of the compartment which is upwardly inclined on the bottom and provided in the upwardly inclined bottom with a ramp opening, means supporting the fuselage in the compartment region and the extended portion overhanging from the end of the compartment portion, the fuselage sides being formed of stressed skin sheets on longitudinally spaced ribs or bulkheads, the fuselage in cross-section in the extended open-bottom portion being C-shaped with outwardly convex sides, a ramp hinged at one end to the end of the bottom opening at the compartment end, a strong frame longéron extending along each side of the opening, a ramp screw strut on each side hinged to the side of the fuselage and to the ramp intermediate its ends, a trunnion fitting comprising part of the hinge connection of the ramp strut with the fuselage, an upper strut rod connected to said fitting and extending upward at an angle to the side frame at the top of the compartment, a lower strut rod connected to said fitting and extending downward to a connection with a longéron at the side of the frame near the lower end of the compartment, and means bracing said strut rods between their ends to the side of the fuselage.

5. In an aircraft in combination, a fuselage having a cargo compartment of closed cross section and a portion extending from one end of the compartment which is upwardly inclined on the bottom and provided in the upwardly inclined bottom with a ramp opening, means supporting the fuselage in the compartment region and the extended portion overhanging from the end of the compartment portion, the fuselage sides being formed of stressed skin sheets on longitudinally spaced ribs or bulkheads, the fuselage in cross-section in the extended open-bottom portion being C-shaped with outwardly convex sides, a ramp hinged at one end to the end of the bottom opening at the compartment end, a strong frame longéron extending along each side of the opening, a ramp screw strut on each side hinged to the side of the fuselage and to the ramp intermediate its ends, a trunnion fitting comprising part of the hinge connection of the ramp strut with the fuselage, an upper strut rod connected to said fitting and extending upward at an angle to the side frame at the top of the compartment, a lower strut rod connected to said fitting and extending downward to a connection with a longéron at the side of the frame near the lower end of the compartment, means bracing said strut rods between their ends to the side of the fuselage, and means limiting lateral movement of said ramp strut relative to the side of the fuselage.

6. In an aircraft in combination, a fuselage having a cargo compartment of closed cross section and a portion extending from one end of the compartment which is upwardly inclined on the bottom and provided in the upwardly inclined bottom with a ramp opening, means supporting the fuselage in the compartment region and the extended portion overhanging from the end of the compartment portion, the fuselage sides being formed of stressed skin sheets on longitudinally spaced ribs or bulkheads, the fuselage in cross-section in the extended open-bottom portion being C-shaped with outwardly convex sides, a ramp hinged at one end to the end of the bottom opening at the compartment end, a strong frame longéron extending along each side of the opening, a ramp screw strut on each side hinged to the side of the fuselage and to the ramp intermediate its ends, a trunnion fitting comprising part of the hinge connection of the ramp strut with the fuselage, an upper strut rod connected to said fitting and extending upward at an angle to the side frame at the top of the compartment, a lower strut rod connected to said fitting and extending downward to a connection with a longéron at the side of the frame near the lower end of the compartment, means bracing said strut rods between their ends to the side of the fuselage, and means limiting lateral movement of said ramp strut relative to the side of the fuselage, said last-mentioned means comprising an elongated guide for the ramp strut.

7. In an airplane in combination, a fuselage comprising a wheel supported compartment section of box cross-section and an overhanging section of C cross section with a bottom opening, a ramp hinged in said opening, operating strut means for forcing the free end of the ramp against the ground to support the overhanging fuselage section, and anchor strut means for transmitting loads from said operating strut means into the sides of the fuselage at the end of the compartment section.

8. In an airplane in combination, a fuselage comprising a wheel supported compartment section of box cross-section and an overhanging section of C cross section with a bottom opening, a ramp hinged in said opening, operating strut means for forcing the free end of the ramp against the ground to support the overhanging fuselage section, and anchor strut means for transmitting loads from said operating strut means into the sides of the fuselage at the end of the compartment section, said anchor strut means extending at an angle to carry the loads to the top and bottom of the fuselage side walls at the end of the compartment section.

MICHAEL WATTER.
ALBERT G. DEAN.

REFERENCES CITED

The following references are of record in the file of this patent:

UNITED STATES PATENTS

| Number | Name | Date |
|---|---|---|
| 2,095,440 | Hajnowski | Oct. 12, 1937 |
| 2,196,546 | Bowers | Apr. 9, 1940 |
| 2,268,009 | Babb et al. | Dec. 30, 1941 |
| 2,315,117 | Freytag | Mar. 30, 1943 |
| 2,323,279 | Van Zelm | June 29, 1943 |